United States Patent [19]

Roccucci

[11] Patent Number: 4,700,147
[45] Date of Patent: Oct. 13, 1987

[54] TRANSISTOR POWER INVERTER WITH SYNCHRONIZING CIRCUIT

[75] Inventor: Silvio Roccucci, Rome, Italy
[73] Assignee: Selenia Spazio, L'Aquila, Italy
[21] Appl. No.: 834,304
[22] Filed: Feb. 27, 1986
[30] Foreign Application Priority Data
  Feb. 28, 1985 [IT] Italy ................................ 47753 A/85
[51] Int. Cl.[4] .......................................... H03K 3/30
[52] U.S. Cl. .................... 331/47; 331/113 A; 363/133
[58] Field of Search ................. 331/47, 113 A, 113 S; 363/22, 24, 131, 133, 134

[56] References Cited
U.S. PATENT DOCUMENTS
3,257,604  6/1966 Colclaser et al. ............... 363/133 X
3,683,208  8/1972 Burens ........................... 363/134 X Primary Examiner—Siegfried H. Grimm
Attorney, Agent, or Firm—Karl F. Ross; Herbert Dubno

[57] ABSTRACT

An oscillator circuit for generating a square wave output for space or terrestrial applications comprising a main oscillator and a saturable transformer forming the feedback loop of the power inverter. According to the invention, a synchronization circuit comprises transistors for shortcircuiting respective branches of the primary winding of this transformer upon detection of signal from differentiators connected to the main oscillator. Means connects a main limiting resistor to the center tap of the primary winding so that flux inversion is effected in the saturable transformer at the end of a power inverter recovery time.

3 Claims, 8 Drawing Figures

TRANSISTOR POWER INVERTER WITH SYNCHRONIZING CIRCUIT

FIELD OF THE INVENTION

My present invention relates to an oscillator circuit for generating a periodic square wave output and, more particularly, to a system for synchronizing a free running oscillator by means of a feedback saturable transformer for such an oscillator circuit.

More particularly, the invention relates to free running oscillators which are stabilized as to frequency in spite of variation in load and, specifically, to such oscillator circuits which utilize a saturable transformer in the feedback loop and, in addition, have a square wave periodic output.

The device of the invention can have space applications or terrestrial applications. Key to the invention is the insertion in the feedback circuit containing the saturable transformer of a synchronization circuit which causes feedback transformer saturation at times strictly dependent upon the synchronizing-signal generator and without impeding frequency adjustment by a potentiometer or any other conventional frequency control means.

BACKGROUND OF THE INVENTION

The use of free running transistor or field effect transistor-oscillators in, low, medium and high power inverters for generating a periodic output from a direct current power source is widespread. Indeed, it is also known in conjunction with free running inverters or converters to provide frequency synchronization which is capable of maintaining a constant frequency regardless of varying load and supply voltage; this has been done without altering the specific charcteristic of the saturable transformer which provides feedback.

In general in the past this has been achieved by using external drivers for the power transistors or field effect transistors of the inverter and this approach was capable of providing fixed frequency square-waveform inverters.

Such driver techniques are, however, not always advantageous and may have a variety of drawbacks including the need for highly complex drivers, the fact that the power transistors or field effect transistors do not always operate within their safety limits during the switching operations, protection against short circuit and overloads requires complex circuitry, and there is a risk of simultaneously switching the two power transistors or field effect transistors into an on state during switching.

OBJECTS OF THE INVENTION

The principal object of the present invention, therefore, is to provide a square-wave inverter type free running oscillator circuit whereby the drawbacks of earlier systems as mentioned above can be obviated.

Another object of this invention is to provide an improved synchronizing device for a saturable transformer feedback loop in a square wave generator of the type described which is capable of assuring a constant inverter frequency, which is more simple and therefore more reliable than driving and synchronizing circuits known in the art, which renders it impossible to simultaneously switch both power transistors or field effect transistors to an on condition during the switching times, and which has a higher efficiency than earlier circuits for this purpose.

SUMMARY OF THE INVENTION

These objects and others which will become apparent hereinafter are attained, in accordance with the present invention in an oscillator circuit for generating a periodic output which comprises:

a main oscillator;

a saturable transformer having a primary winding and a secondary winding;

a power inverter connected to the secondary winding and having an output element developing the periodic output and connectable to a load;

a main limiting resistor connected between the primary winding and a direct current power source;

a synchronization circuit connected between the main oscillator and the primary winding for energizing the primary winding from said source at a cadence determined by the main oscillator; and a differentiator connected between the main oscillator and the synchronization circuit.

According to the invention, I provide:

means in the synchronization circuit responsive to an output signal from the differentiator for shortcircuiting the primary winding upon detection of the signal; and means connecting the resistor to the primary winding so as to effect flux inversion in the saturable transformer by means of current flowing from the source through the resistor at the end of a power inverter recovery time.

According to a further feature of the invention, the synchronization circuit includes:

a current limiting transistor having a base, and an emitter-collector network connected in series with the primary winding and the source;

a diode bridge across the emitter-collector network; and a further current limiting resistor connected between the base and the source for limiting the direct current flowing into the saturable transformer for flux inversion.

Means can be provided for automatically protecting the power inverter circuit against shortcircuit and this can, of course, include any conventional means for doing so.

Advantageously:

the saturable transformer has a tapped primary winding to a centertap of which the main limiting resistor is connected and a pair of primary winding branches to opposite sides of said centertap;

a respective emitter-collector network of a respective current limiting transistor is connected across each of the branches and has a respective diode bridged thereacross;

a base of each of the transistors is connected by a respective further current limiting resistor to a common terminal of the source; and a respective differentiator is connected to each of the bases.

Furthermore, the inverter can comprise:

a pair of power inverter transistors, each connected to a branch of the secondary winding on opposite sides of a centertap thereof by respective base resistors and having emitter-collector networks;

a diode connecting a common junction of the networks of the power inverter transistors to the centertap of the secondary winding, the common junction being grounded; and an output transformer forming the output element and having a centertapped primary winding and a secondary winding connected across the load, the centertap of the primary winding of the output transformer is connected to the supply and the emitter-collector networks of the power inverter transistors are connected to respective branches of the primary winding of the output transformer.

The improvement of the present invention has application in space uses, for auxiliary low and medium power supplies to feed satellite control circuits and to feed telecommunication transponders or radars.

In terrestrial applications, the circuit of the invention can be used for alternating currents square wave and fixed frequency generators with power ranging from a few watts to 10 kilowatts or more depending upon the load requirement.

Indeed, the input oscillator may be a variable frequency oscillator without effecting any of the principles described above or hereinafter.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
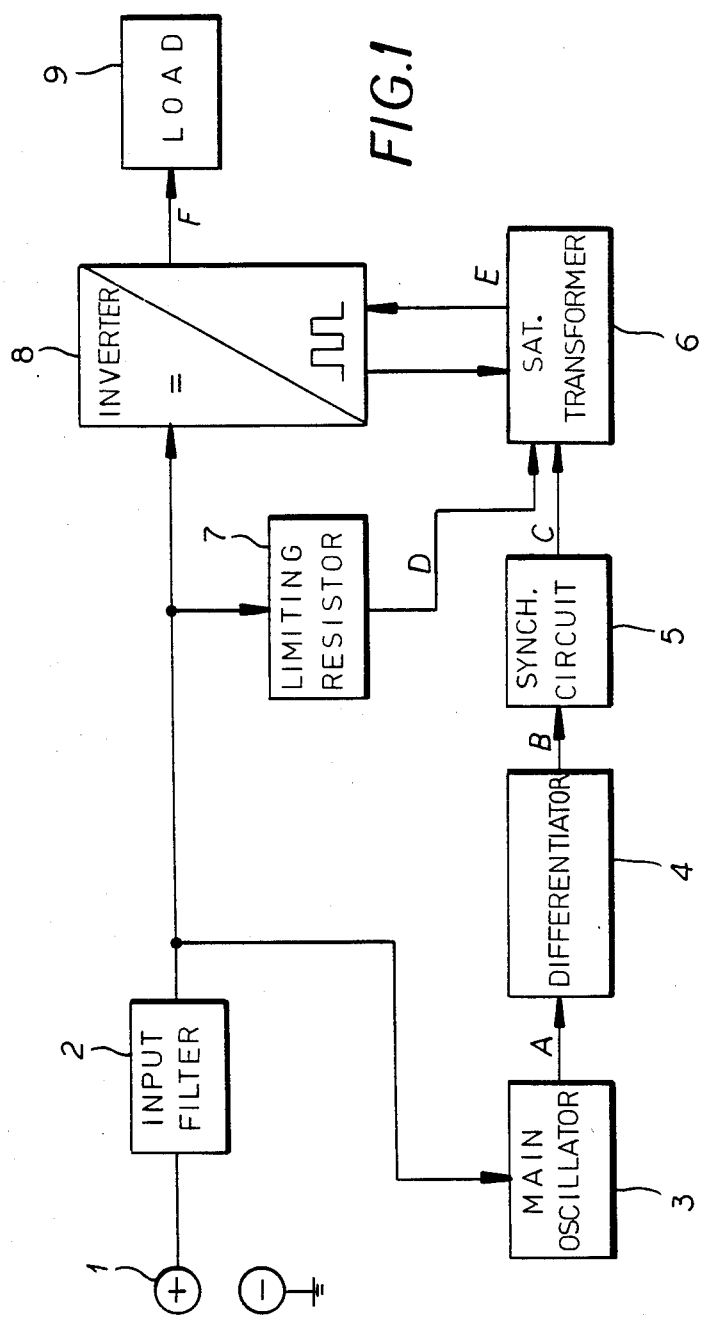
FIG. 1 is a block diagram illustrating the circuit of the present invention.

From FIG. 1 it will be apparent that the primary source power supply voltage 1, generally a direct current voltage which is unregulated and which can have any required capacity to deliver current to the load has one terminal connected to the input filter 2, the other terminal being grounded and when necessary the various units will be grounded to complete the electrical circuit.

The input filter 2 can be of any conventional type and is designed primarily to filter out alternating current components or transients.

Figure 2A:
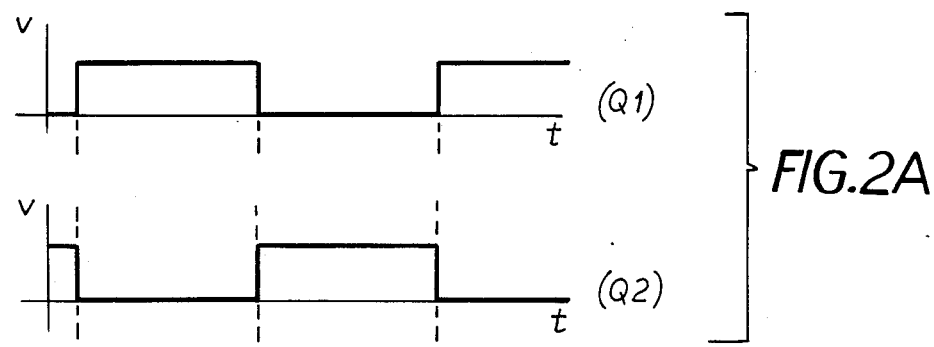
FIGS. 2A-2F are waveform diagrams illustrating the principles of this invention along the same time scale on the abscissa.

The power is applied to the main oscillator 3 whose output A is a square wave signal represented in FIG. 2A and is applied to the differentiator 4. The output of the differentiator 4 is represented in B and corresponds to the signal appearing in FIG. 2B of the waveform diagrams.

In both FIGS. 2A and 2B, as in other figures mentioned below, two sets of waveforms are shown in each, representing the signals applied to the two transistors of the synchronizing circuit as will be described.

Figure 2B:
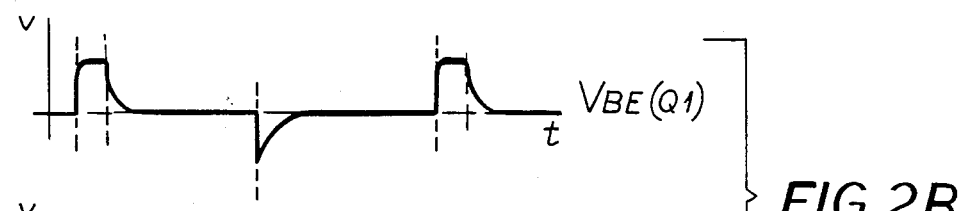
Figure 2C:
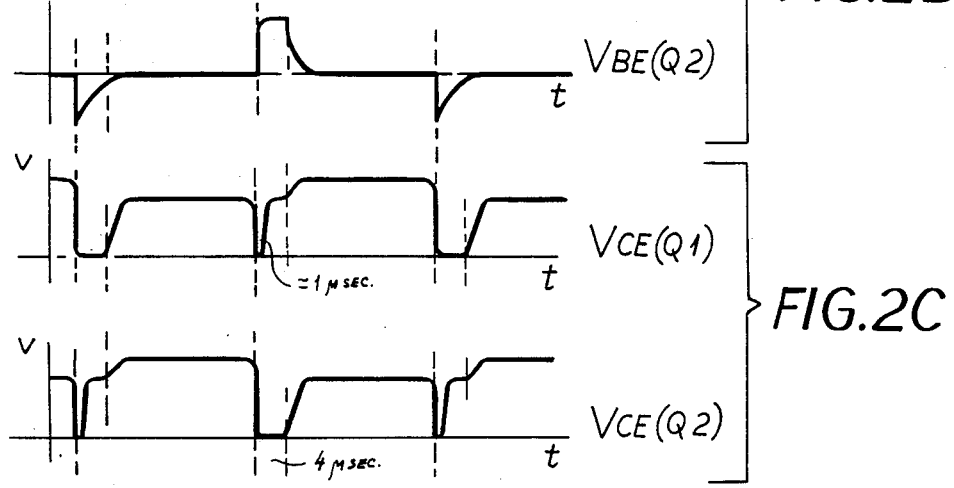

The synchronizing circuit itself is represented in FIG. 1 at 5 and its outputs are represented in the waveform diagram of FIG. 2C, these outputs beings applied at C to the saturable transformer 6 which constitutes the feedback element for the power inverters and is drawn into saturation by these signals.

The power inverters are represented at 8 diagrammatically and are connected to the load 9 while the limiting resistor 7 has been represented in block form as well in FIG. 1.

Figure 2D:
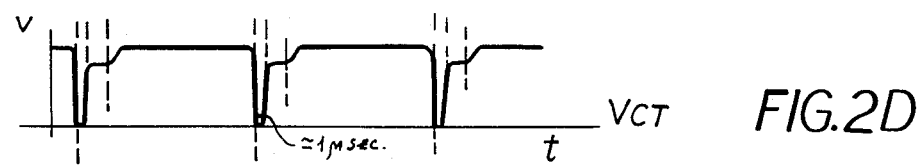
Figure 2E:
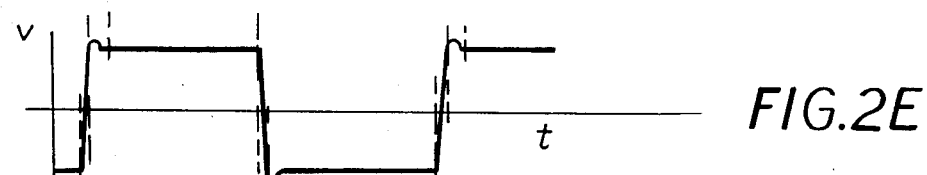
Figure 2F:
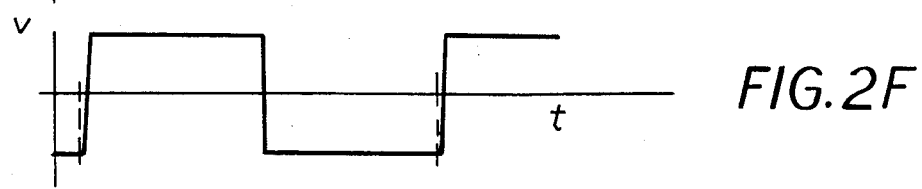

The limiting resistor output waveform delivered at D to the saturable transformer 6 has been represented in FIG. 2D while the saturable transformer output to the power inverter is seen at E in FIG. 1 and FIG. 2E of the waveform diagrams (clearly indicating saturation). The square wave output signal delivered to the load at F in FIG. 1 has been represented in FIG. 2F of the waveform diagrams.

From the block diagram it will be apparent that the primary or main direct current voltage supplied by the source 1 to the input filter with rejects alternating current, is passed free from noise and the alternating current and delivered to the inverter 8. The inverter 8, of course, has a feedback loop which includes the saturable transformer 6.

The main oscillator 3 which is also conventional and can be of any desired variable frequency type, can utilize an integrated circuit or conventional discrete components and delivers its square wave signals (FIG. 2A) to the differentiators 4.

The differentiated signal (FIG. 2B) drives the synchronization circuit 5 which acts upon the feedback saturation transformer 6 (by driving it into saturation) so as to maintain the inverter frequency constant with respect to the load 9 and with respect to the supply voltage variations of the source 1. The limiting resistor 7, also represented at R5 in FIG. 3, during the interval for which the synchronization signal is operative (about 4 microseconds) limits the current through the particular winding of the feedback transformer from the supply line.

Figure 3:
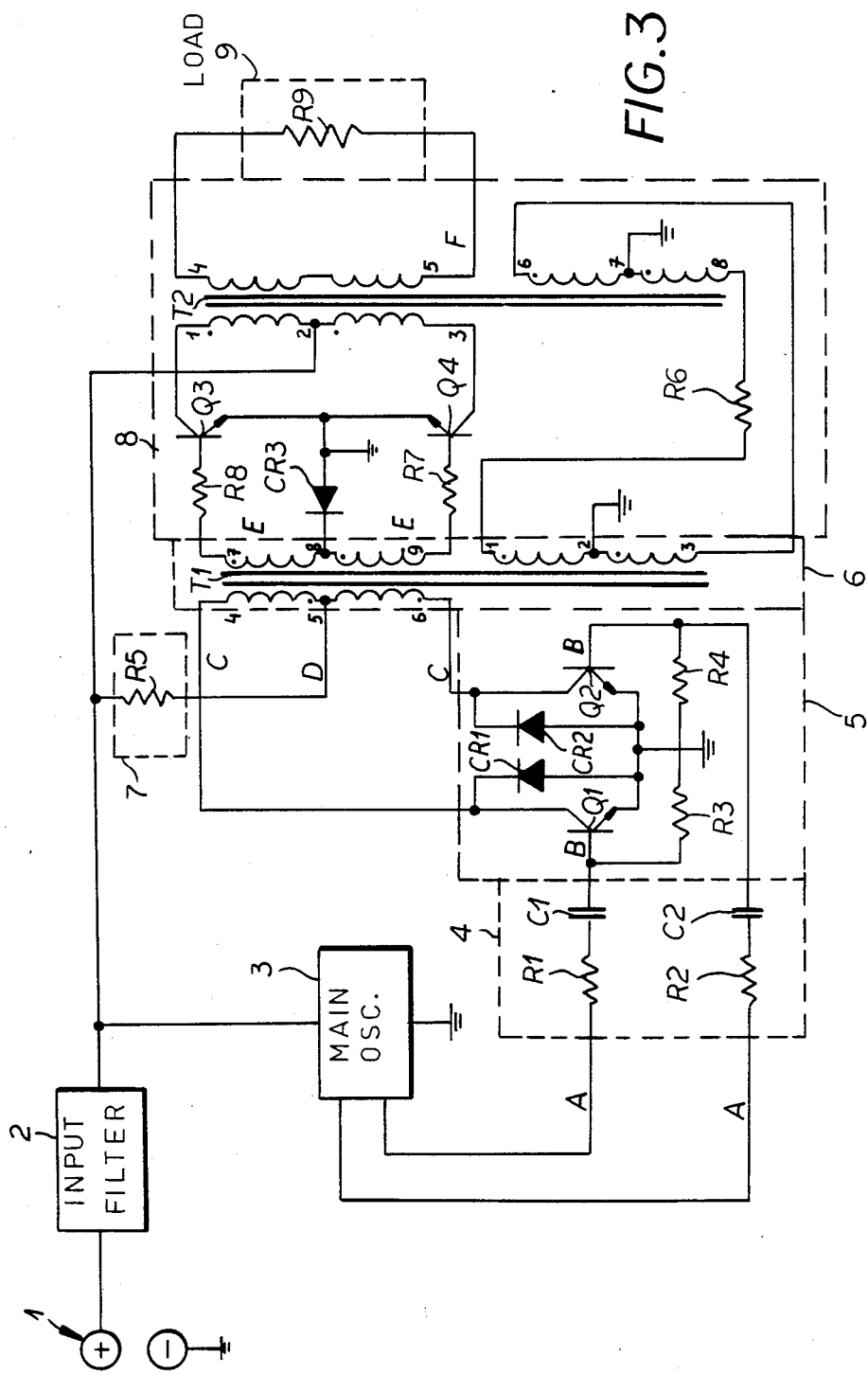
FIG. 3 is a circuit diagram illustrating the principles of the invention.

The circuit of FIG. 3 illustrates this in greater detail. The differentiator 4, for example, is seen to comprise a series circuit of a resistor R1 or R2 and a respective capacitor C1 or C2 connected to the respective base B of a respective transistor Q1 or Q2. The collectors of these transistors Q1 and Q2 are tied to the terminals 4 and 6 of respective halves of the primary winding of the saturable transformer 6 (T1) which has a centertap forming terminal 5. The emitters of transistors Q1 and Q2 are connected in common to ground and across each emitter-collector network of the transistors a respective diode CR1 and CR2 is provided, poled from emitter to collector. Base bias resistors R3 and R4 are also connected from each emitter to the respective base of the transistor Q1 and Q2. The waveforms of points A, B, C, D, E and F shown in FIG. 3 correspond to the waveforms of FIGS. 2A-2F, respectively.

The saturable feedback transformer T1 can utilize a magnetic material such as Mumetal, Hypersil, etc.

It should be noted that inverter 8, without the winding represented by terminals 4, 5, 6 on the saturable transformer T1 will sustain self oscillation at a frequency substantially lower than that set by the synchronizing device which effects saturation of the transformer 6 at the timing determined by the main oscillator 3.

Terminals 1, 2, 3 of transformer T1 are those of a feedback winding connected in series with the winding of the terminals 6, 7 and 8 on a transformer T2 also representing the output element of the circuit, through a resistor R6.

Terminals 4, 5, 6 of transformer T1 are the terminals of the synchronizing winding while terminals 1,2,3 receive a bias current for saturable transformer 6 (T1) from the transformer T2 at the output frequency thereof.

FIG. 2C, therefore, shows the collector to emitter voltage waveforms of the transistors Q1 and Q2.

If one compares FIG. 2C with FIGS. 2A and 2B, it will be seen that when the differentiator output, i.e. the output of the differentiator 4, is applied to the bases B of transistors Q1 and Q2, the respective collector voltage falls to zero, thereby shortcircuiting the respective branch between terminals 4 and 5 or between terminals 5 and 6 of the transformer T1, this being promoted by the diodes CR1 and CR2.

This shortcircuit lasts approximately as long as the power inverter recovery time, i.e. the recovery time of the transistors Q3 and Q4 of the power inverter.

The presence of supply voltage at terminal 5 of transformer T1, via the limiting resistor 7 also represented at R5, causes magnetic flux inversion by means of current flowing from the source through the resistor at the end of a power inverter recovery time.

The signal applied to the bases of transistors Q1 and Q2 is thus selected to have a duration of about 4 microseconds, a value which assures even on the worst load and temperature conditions, perfect synchronization.

The transistors Q1 and Q2 have collector emitter voltages corresponding to a value zero which reflects the short circuit but also to other voltage levels, one higher and one lower, due to the combination of alternating current and direct current voltages present on the centertap 5 of the transformer T1.

FIG. 2D shows the voltage waveform on terminal 5 (centertap) of transformer T1. The shortcircuit condition during the recovery time of the power inverter followed by magnetic flux inversion with transistors Q1 and Q2 still conductive are clearly visible here. When transistors Q1 and Q2 stop conducting, the voltage on centertap terminal 5 of transformer T1 is equal to that of the supply voltage 1.

The power inverter 8 may comprise resistors R7 and R8 connecting the bases of the transistors Q3 and Q4 to the respective branches of the transformer T1, i.e. the terminals 7 and 9 of the secondary winding thereof. The centertap 8 of the secondary winding is connected to a common junction of the emitters of the transistors Q3 and Q4 by the diode CR3 and this common junction may be grounded.

The feedback circuit 8 containing the saturable transformer 6 (T1) thus has a synchronization circuit 5 which triggers the feedback transformer 6 into saturation at times strictly dependent upon the output of the synchronizing generator which is the main oscillator 3. The differentiated signal (FIG. 2B), formed from the output A of the oscillator 3, drives the synchronization circuit 5 which acts upon the feedback saturation transformer T1 so as to maintain the inverter frequency constant and hence a constant frequency at the load 9 regardless of the supply voltage variations of the source 1 and the fluctuation in the current drawn by the load 9.

I claim:

1. In an oscillator circuit for generating a periodic output, which comprises:
    a direct current power source;
    a main oscillator connected to said direct current power source;
    a saturable transformer having a primary winding having first and second branches and a common centertap, and a secondary winding having first and second branches and a common centertap;
    a power inverter connected to said secondary winding and having an output element developing said periodic output and connectable to a load, said power inverter including:
    a pair of power inverter transistors, each having a base connected to a respective one of said branches of said secondary winding on opposite sides of said centertap of said secondary winding by a respective base resistor, said power-inverter transistors each having a respective emitter-collector network,
    a first diode connecting a common junction of said networks of said power inverter transistors to said centertap of said secondary winding, said common junction being grounded, and
    an output transformer forming said output element and having a primary winding having a centertap separating branches of the primary winding of said output transformer and a secondary winding connected across said load, said centertap of said primary winding of said output transformer being connected to said direct current power source, said emitter-collector networks of said power inverter transistors being connected to respective branches of said primary winding of said output transformer;
    a main limiting resistor connected between said centertap of said primary winding of said saturable transformer and said direct current power source;
    a differentiator connected to said main oscillator; and
    a synchronization circuit connected between said differentiator and said primary winding of said saturable transformer for energizing said primary winding of said saturable transformer from said source at a cadence determined by said main oscillator; and
    the improvement which comprises:
    means in said synchronization circuit responsive to an output signal from said differentiator for alternately short-circuiting said first and second branches of said primary winding of said saturable transformer upon detection of said signal; and
    means connecting said resistor to said centertap of the primary winding of said saturable transformer as to effect flux inversion in said saturable transformer by means of current flowing from said source through said resistor at the end of a power inverter recovery time.

2. The oscillator circuit defined in claim 1 wherein said synchronization circuit includes:
    a first transistor having a first base, and a first emitter-collector network connected in series with said first branch of said primary winding of said saturable transformer and said source;
    a second transistor having a second base, and second emitter-collector network connected in series with said second branch of said primary winding of said saturable transformer and said source;
    a second diode bridged across said first emitter-collector network;
    a third diode bridged across said second emitter-collector network; and
    respective base-bias resistors connected to said first and second bases.

3. The oscillator circuit defined in claim 2, further comprising means for automatically protecting said power inverter circuit from short circuit.

* * * * *